T. E. ROBERTS.
SPARK ARRESTER AND CONSUMER.

No. 186,367. Patented Jan. 16, 1877.

T. E. ROBERTS.
SPARK ARRESTER AND CONSUMER.
No. 186,367. Patented Jan. 16, 1877.

UNITED STATES PATENT OFFICE.

THOMAS E. ROBERTS, OF IONIA, MICHIGAN.

IMPROVEMENT IN SPARK ARRESTERS AND CONSUMERS.

Specification forming part of Letters Patent No. 186,367, dated January 16, 1877; application filed February 5, 1876.

*To all whom it may concern:*

Be it known that I, T. E. ROBERTS, of Ionia, in the county of Ionia, and in the State Michigan, have invented certain new and useful Improvements in Spark Arresters and Consumers; and do hereby declare that the following is a full, clear, and exact description thereof, reference being had to the accompanying drawings, and to the letters of reference marked thereon, making a part of this specification.

The nature of my invention consists in certain improvements upon the spark arrester and consumer for which Letters Patent No. 154,909 were granted to me September 8, 1874, as will be hereinafter more fully set forth.

In order to enable others skilled in the art to which my invention appertains to make and use the same, I will now proceed to describe its construction and operation, referring to the annexed drawings, in which—

Figure 1:
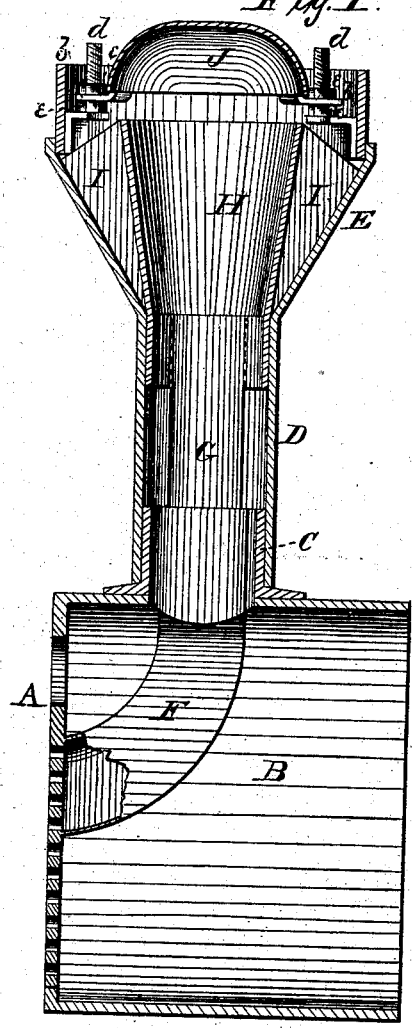
Figure 3:
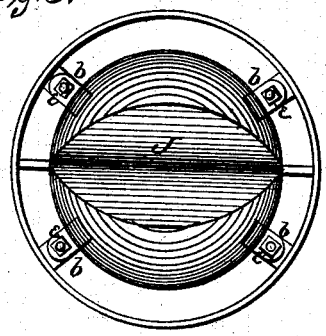
Figure 2:
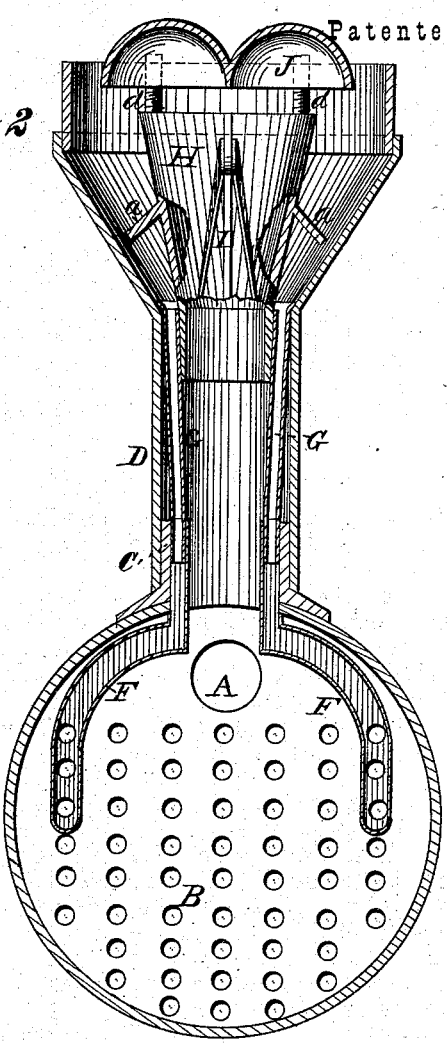
Figure 4:
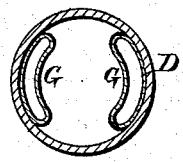

Figure 1 is a longitudinal section of my invention. Fig. 2 is a cross-section of the same. Fig. 3 is a plan view of the smoke-stack, and Fig. 4 is a horizontal section of the same.

A represents the flue-sheet; B, the smoke-box; C, the saddle; D, the smoke-stack, and E the enlarged top of the smoke-stack, all of which parts are constructed in the usual way. On each side of the smoke-box B is a curved flue, F, the lower ends of which are fastened to the flue-sheet A, and inclose some of the outer row of flues. The upper ends of the flues F extend into the saddle C, on opposite sides thereof. G G are two flues or tubes, extending up along the opposite sides of the smoke-stack D, their lower ends forming spouts to be inserted in the upper ends of the flues F. To the upper ends of the flues are attached a ring, H, the upper end of which is enlarged in oval funnel shape within the smoke-stack, the space between them being divided by inclined flanges I, which guide the sparks into the flues G. In addition to these flanges I use overhanging aprons *a a*, as shown in Fig. 2, extending from the funnel to near the sides of the enlarged top E, as auxiliary guides for conducting the sparks back into the flues. J is the deflector, made in the same manner as described in my former patent above referred to. The deflector, in this case, is provided with projecting ears *b b*, which are placed upon upright bolts *d d*, fastened within the upper part of the enlarged top E of the smoke-stack, and the height of the deflector thereon regulated by means of nuts *e e* above and below the ears *b b*.

Having thus fully described my invention, what I claim as new, and desire to secure by Letters Patent, is—

The combination of the smoke-box B, curved flues F F, flues G G in the smoke-stack D, the oval funnel-shaped ring H, provided with inclined guides I and auxiliary guides *a*, and the deflector J, with ears *b*, adjustably connected to the top of the smoke-stack by the vertical screws *d* and nuts *e*, all substantially as and for the purposes herein set forth.

In testimony that I claim the foregoing I have hereunto set my hand this 31st day of December, 1875.

THOS. E. ROBERTS.

Witnesses:
 C. O. THOMPSON,
 T. BAUSLAUGH.